(12) United States Patent
Caruba et al.

(10) Patent No.: US 9,945,963 B1
(45) Date of Patent: Apr. 17, 2018

(54) DYNAMIC CONTROL OF EVENT DUMPING

(71) Applicant: Siemens Medical Solutions USA, Inc., Malvern, PA (US)

(72) Inventors: James Frank Caruba, Bartlett, IL (US); Trudy Dayle Rempel, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 15/666,175

(22) Filed: Aug. 1, 2017

(51) Int. Cl.
*G01T 1/20* (2006.01)
*G01T 1/208* (2006.01)

(52) U.S. Cl.
CPC ............ *G01T 1/208* (2013.01); *G01T 1/2018* (2013.01)

(58) Field of Classification Search
CPC .............................. G01T 1/208; G01T 1/2018
See application file for complete search history.

(56) References Cited

U.S. PATENT DOCUMENTS

| | | | |
|---|---|---|---|
| 3,011,057 A | 11/1961 | Anger | |
| 4,221,967 A | 9/1980 | Wang et al. | |
| 4,535,242 A | 8/1985 | Dirkse et al. | |
| 4,546,255 A | 10/1985 | Knoll et al. | |
| 5,210,423 A | 5/1993 | Arseneau | |
| 6,740,881 B2 | 5/2004 | Malmin | |
| 7,439,515 B2 | 10/2008 | Bak | |
| 2004/0036025 A1* | 2/2004 | Wong | G01T 1/1642 250/363.09 |
| 2014/0175299 A1* | 6/2014 | Spahn | G01T 1/247 250/394 |

FOREIGN PATENT DOCUMENTS

| | | |
|---|---|---|
| WO | 2010/080046 A2 | 7/2010 |
| WO | 2012/101332 A1 | 2/2012 |

* cited by examiner

*Primary Examiner* — Mark R Gaworecki

(57) ABSTRACT

System includes a signal processing system to receive a digital signal associated with first scintillation events and to determine a value associated with each of the events, a backend processing system to receive the values, determine an event rate based on the received values, determine whether the event rate is greater than a first threshold, and, if the event rate is greater, transmit a first instruction to increase a consecutive event dump level, and an event management control to receive the first instruction to increase the consecutive event dump level, increase the consecutive event dump level in response to the received instruction, determine a number of consecutive scintillation events of detected second scintillation events, determine to dump the consecutive scintillation events based on a comparison between the number of consecutive scintillation events and the consecutive event dump level, and transmit a second instruction to dump the consecutive scintillation events.

20 Claims, 7 Drawing Sheets

DYNAMIC CONTROL OF EVENT DUMPING

BACKGROUND

According to conventional nuclear medicine imaging, radiopharmaceuticals are introduced into a patient's body and migrate to organs, bones or tissues of interest. The radiopharmaceuticals emit gamma photons which are received by a detector. The detector generates signals based on the received gamma photons, and those signals are processed to determine the locations from which the gamma photons were emitted (i.e., the locations of the organs, bones or tissues of interest), and the intensities of the received gamma photons, which correspond to the amount of pharmaceutical uptake and the attenuation properties of organs, bones or tissues located between the locations and the detector. These locations and intensities are processed to produce a planar image of a region of the patient's body.

A gamma photon detector (also, a gamma camera) typically consists of a scintillator and light sensors optically coupled thereto. In operation, the scintillator receives (i.e., absorbs) a gamma photon and emits a number of visible light photons in response. The light photons are in turn detected by the light sensors, which may comprise photomultiplier tubes (PMTs). The PMTs absorb the light photons and produce corresponding electrons via the photoelectric effect. Each PMT multiplies the electrons it produces, resulting in an electrical pulse from each PMT whose magnitude is proportional to the energy of the original gamma photon received by the scintillator.

Continuing the above example, the scintillator may receive a second gamma photon and emit visible light photons in response. The PMTs absorb the light photons and produce electrical pulses as described above. If these electrical pulses are produced prior to decay of the electrical pulses resulting from the originally-received gamma photon, the electrical pulses are superposed, or "pile up", on each other in the output signals of the PMTs. These piled-up pulses do not provide useful imaging information, as it is not known what portion of the piled-up pulse is attributable to a first gamma photon and what portion is attributed to a second gamma photon. The problem may be exacerbated by additional gamma photons received in close succession, whose resultant PMT pulses may pile up on any number of previously-generated pulses. The problem is further exacerbated with increasing scintillator decay time (i.e., the amount of time over which light photons are emitted in response to a received gamma photon).

To address this problem, conventional imaging systems may discard signals in which two or more pulses are piled-up on one another, or allow the detectors to saturate, thereby producing a biased count rate-dependent response. Both approaches provide sub-optimal results.

BRIEF DESCRIPTION OF THE DRAWINGS

The construction and usage of embodiments will become readily apparent from consideration of the following specification as illustrated in the accompanying drawings, in which like reference numerals designate like parts, and wherein.

DETAILED DESCRIPTION

The following description is provided to enable any person in the art to make and use the described embodiments and sets forth the best mode contemplated for carrying out the described embodiments. Various modifications, however, will remain readily apparent to those in the art.

Some embodiments control the output count rate of a gamma detector by preventing integrated events of certain multiple-event pileup incidents from being processed by the detector's un-piling algorithm. For example, a current event and a previous event may be discarded upon detecting that a particular number of consecutive events have occurred. The particular number will be referred to herein as a consecutive event dump level, and may be dynamically controlled based on a detected output event count rate. The threshold event count rate settings for triggering a change to the consecutive event dump level may be based on off-line modelling of the detector response. According to some embodiments, hysteresis is employed to reduce system oscillations. The discarded events are naturally randomized, and of reduced precision due to statistical errors inherent to the un-piling algorithm, which increase in direct relation to the number of pulses to be unpiled.

Figure 1:
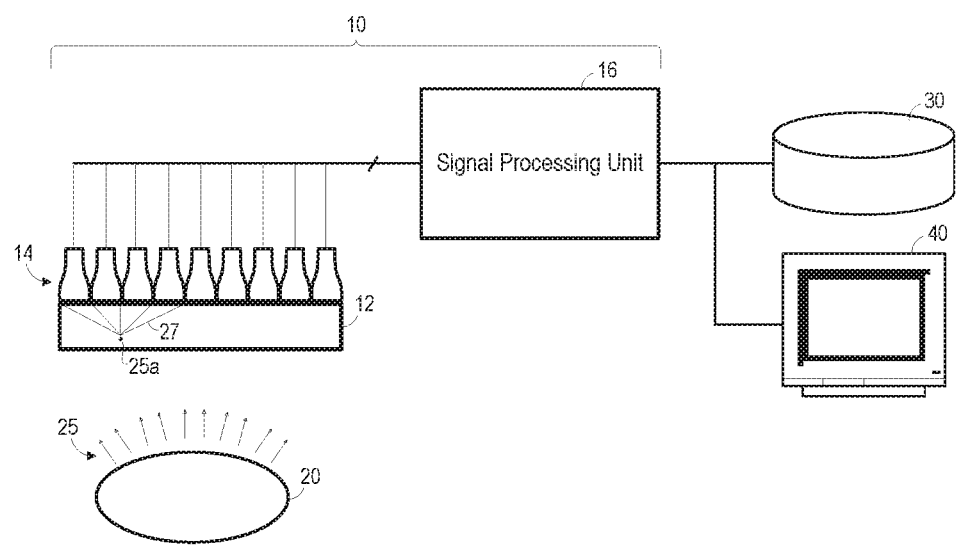
FIG. 1 illustrates a system according to some embodiments.

FIG. 1 illustrates detector 10 according to some embodiments. Detector 10 will be described below in the context of an Anger-type gamma camera, but embodiments are not limited thereto. Detector 10 may comprise any scintillator-based imaging device (e.g., a Positron Emission Tomography scanner). Some embodiments may be applied to any set of overlapping signals of any origin which have a duration sufficient for adequate sampling, and a constant shape (i.e., a shape which scales with energy).

Detector 10 includes scintillation crystal 12, light sensor array 14, and a signal processing unit 16. Scintillation crystal 12 may comprise a thallium-doped sodium iodide crystal that generates light photons in response to gamma radiation 25 received from volume 20 (e.g., a patient's body). Scintillation crystal 12 therefore converts the gamma radiation (e.g., gamma photon 25a) into light photons (e.g., light photons 27), which may be detected by sensor array 14.

Sensor array 14 may comprise an array of PMTs. A typical PMT of sensor array 14 may include a semi-transparent photocathode, a focusing grid, dynodes, and an anode (not shown). Sensor array 14 converts light photons emitted by scintillation crystal 12 into representative electronic signals. Signal processing unit 16 receives the electronic signals from the sensor array 14 and processes the electronic signals to generate an image of volume 20. Images generated by signal processing unit 16 may be stored in data storage device 30 and/or displayed on display 40.

According to some embodiments, a radioactive isotope (not shown) is administered to volume 20. The radioactive isotope emits gamma photons while present in volume 20, and these gamma photons 25 subsequently exit volume 20. Gamma photons 25 are collimated by a collimator (not shown) disposed between volume 20 and scintillation crystal 12 (to filter out scattered or stray gamma radiation), and the thus-collimated photons are received at various locations of scintillation crystal 12.

Figure 2:
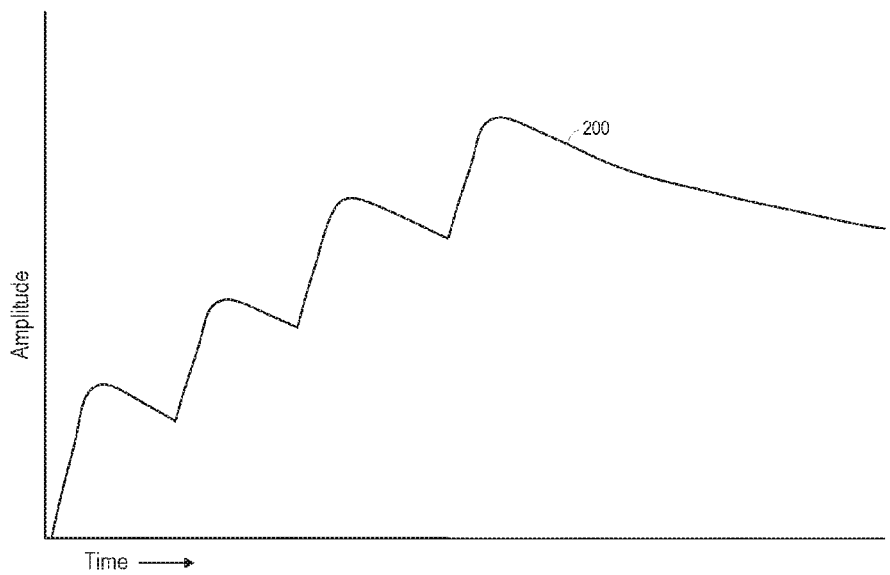
FIG. 2 illustrates a received signal according to some embodiments.
Figure 3:
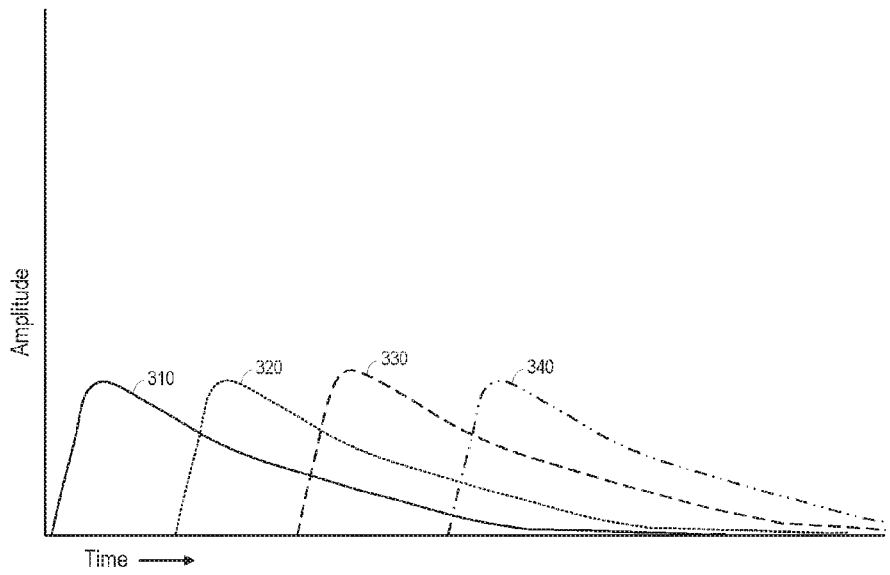
FIG. 3 illustrates unpiled pulses of the FIG. 2 signal according to some embodiments.

FIG. 2 illustrates signal 200 output by a PMT of array 14 according to some embodiments. Signal 200 is a superposition of four pulses, in which each pulse is piled-up on each preceding pulse. In other words, signal 200 represents four gamma photon interactions with scintillator 12, in which light photon emission resulting from each gamma photon interaction begins before the completion of light photon emission resulting from each previous gamma photon interaction. FIG. 3 illustrates four pulses 310, 320, 330 and 340 corresponding to each gamma photon interaction, and which together (i.e., summed) comprise signal 200. Embodiments are not limited to a four pulse pile-up or to pile ups in which each pulse is piled-up on each preceding pulse. The pulses need not have equal amplitude.

Some embodiments include functionality to "un-pile" a signal composed of piled-up pulses. For example, a signal comprised of two or more piled-up pulses (e.g., signal 200) is received and the respective energies of each constituent pulse (e.g., pulses 310, 320, 330 and 340) are estimated therefrom. The respective energies may be used to validate each pulse (e.g., to determine whether the pulse represents scattered gamma radiation or otherwise exhibits unacceptable signal-to-noise ratio characteristics), and/or to determine the locations of the gamma photon interaction corresponding to each pulse. Pulse un-piling preserves the information of the piled-up pulses, which is often preferable to simply discarding a piled-up pulse. However, conventional pulse un-piling algorithms exhibit increased error as the number of piled-up pulses increases, and a rate of received events may exceed the hardware's ability to process piled-up signals using an un-piling algorithm.

Figure 4:
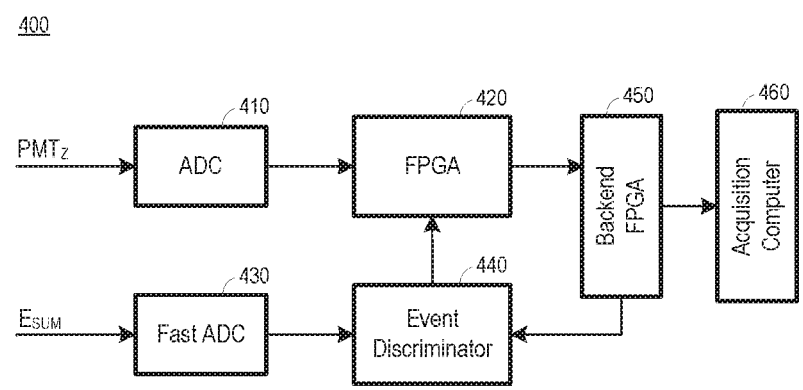
FIG. 4 is a functional block diagram of elements of a system according to some embodiments.

FIG. 4 is a block diagram of system 400 according to some embodiments. System 400 may comprise an implementation of signal processing unit 16 of FIG. 1 according to some embodiments. System 400 may include additional components, and embodiments may include components other than those shown in FIG. 4.

Analog-to-digital converter (ADC) 410 receives a Z (energy)-channel signal from a PMT and samples the signal based on a clock (unshown). The digital samples are sent to field-programmable gate array (FPGA) 420, which integrates the digital samples and may perform other processing such as un-piling as described above. FPGA 420 then transmits a total energy for each detected event to backend FPGA 450. Backend FPGA 450 generates a packet for each event including an x-y position and an energy, buffers the packets, and transmits the packets via a network protocol to acquisition computer 460. The functions attributed herein to FPGA 420 and backend FPGA 450 may be implemented by other types of processing hardware and are not limited to an FPGA.

Fast ADC 430 receives and samples an $E_{sum}$ signal, which is a sum of the illustrated $PMT_Z$ signal and the Z-channel signals of other PMTs of detector 10. Fast ADC 430 samples the signal at a clock rate which is faster than the sampling clock rate of ADC 410. For example, ADC 410 may sample the signal based on a 30 MHz clock and fast ADC 430 may sample the signal based on a 120 MHz clock which is synchronized with 30 MHz clock.

Event discriminator 440 receives the sampled signal from fast ADC 430 and provides a trigger to FPGA 420 which indicates the start of an event. Due to the finer resolution of fast ADC 430 as compared to ADC 410, event discriminator 440 may detect an event and instruct FPGA 420 to begin integrating the event before the data of the event leaves ADC 410.

Particularly in high-dose situations, FPGA 420 may provide information to backend FPGA 450 faster than the information can be processed and transmitted to acquisition computer 460. Such a scenario may overflow the buffers of backend FPGA 450. According to some embodiments, and as will be described below, event discriminator 440 includes an event management control which may instruct FPGA 420 to dump, or ignore, certain events based on a consecutive event dump level setting. This setting may be modified (e.g., increased or decreased) based on feedback received from backend FPGA 450. Generally, backend FPGA 450 monitors a count rate and may send a signal to the event management control of event discriminator 440 to increase the consecutive event dump level setting (typically resulting in dumping of fewer events) if the count rate is below a threshold, and to decrease the consecutive event dump level setting (i.e., typically resulting in dumping more events) if the count rate is above a threshold. Such a system may provide a higher net count rate of higher-quality events than prior systems.

According to some embodiments, FPGA 420 receives the Z-channel signals of a plurality of other PMTs (e.g., 12-13 PMTs) of detector 10 and performs the functions attributed thereto herein with respect to each of the Z-channel signals. Moreover, event discriminator 440 and the aforementioned event management control may be implemented in a single FPGA which also receives the Z-channel signals of a plurality of other PMTs (e.g., 5 PMTs) of detector 10 and performs the same channel processing functions.

Figure 5:
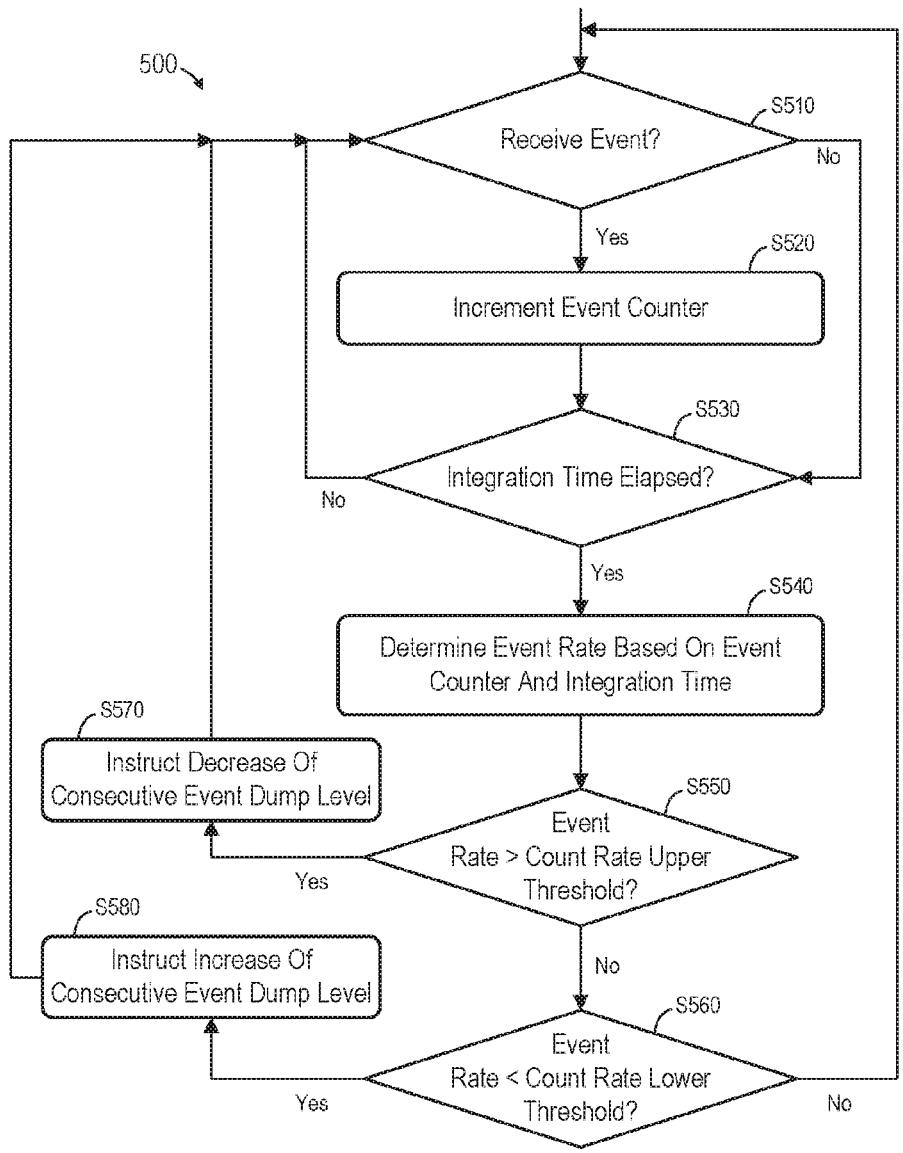
FIG. 5 is a flow diagram of a process to control a consecutive event dump level according to some embodiments.

FIG. 5 is a flow diagram of process 500 to instruct control of a consecutive event dump level according to some embodiments. Process 500 may be implemented by backend FPGA 450 of FIG. 4, but embodiments are not limited thereto. Process 500 and the other processes described herein may be performed using any suitable combination of hardware, software or manual means. Software embodying these processes may be stored by any non-transitory tangible medium, including a fixed disk, a floppy disk, a CD, a DVD, a Flash drive, or a magnetic tape.

Figure 6:
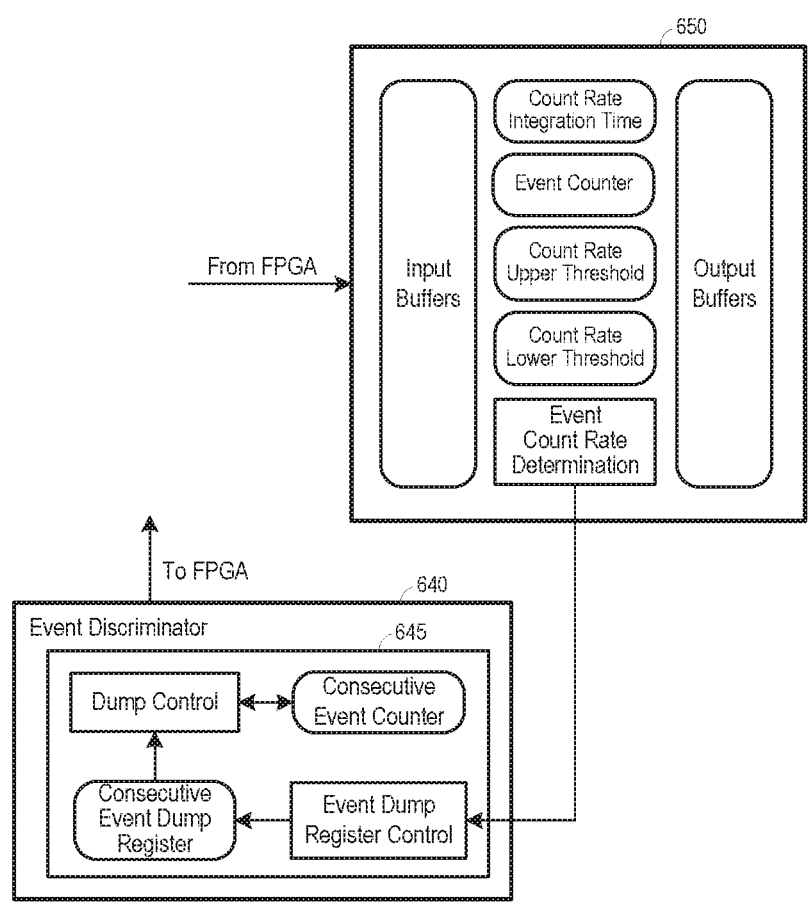
FIG. 6 is a functional block diagram of elements of a system to control a consecutive event dump level and control event dumping according to some embodiments.

FIG. 6 illustrates backend FPGA 650 and event discriminator 640 for the purposes of describing process 500 according to some embodiments. Backend FPGA 650 includes input buffers to receive data from an FPGA as described above and an event count rate determination module to perform process 500. Event discriminator 640 includes event management control 645 as mentioned above.

At S510, it is determined whether an event has been received, for example at the input buffers of backend FPGA 650. As described above, an event may be represented by a packet including an energy and an x-y position. If so, an event counter is incremented at S520 and it is determined at S530 whether an integration time has elapsed. Backend FPGA 650, as shown, includes registers for storing both the event counter and the count rate integration time. According to some embodiments, the integration time for the event counting circuit and can be configured from 0-1.342 seconds in 10 ns increments.

Flow returns to S510 if the integration time has not yet elapsed, and cycles between S510, S520 and S530 as described above (if an event is received) or between S510 and S530 (if an event is not received) until it is determined at S530 that an integration time has elapsed. At S540, an event rate is determined based on the current value stored in the event counter and the integration time. According to some embodiments, count rate=event counter/integration time.

At S550, it is determined whether the determined count rate is greater than a count rate upper threshold. FIG. 6 illustrates count rate upper threshold register and count rate lower threshold register of backend FPGA 650 for storing the count rate upper and lower thresholds, respectively. According to some embodiments, the count rate thresholds can be configured with one count granularity from 0 to $2^{20}$ counts. Also, in some embodiments, the count rate upper and lower thresholds may differ to allow for hysteresis.

Flow proceeds to S560 if it is determined at S550 that the event rate is not greater than the count rate upper threshold. At S560, it is determined whether the determined count rate is less than the count rate lower threshold. If not, flow returns to S510 and continues as described above.

If, however, it is determined at S550 that the event rate is greater than the count rate upper threshold, a decrease of the consecutive event dump level is instructed at S570. S570 may comprise sending a signal from FPGA 650 to the event dump register control module of event management control 645.

Similarly, if it is determined at S560 that the event rate is less than the count rate lower threshold, an increase of the consecutive event dump level is instructed at S580. S580 may also comprise sending a corresponding signal from FPGA 650 to the event dump register control module of event management control 645. Flow returns to S510 from S570 or S580.

Figure 7:
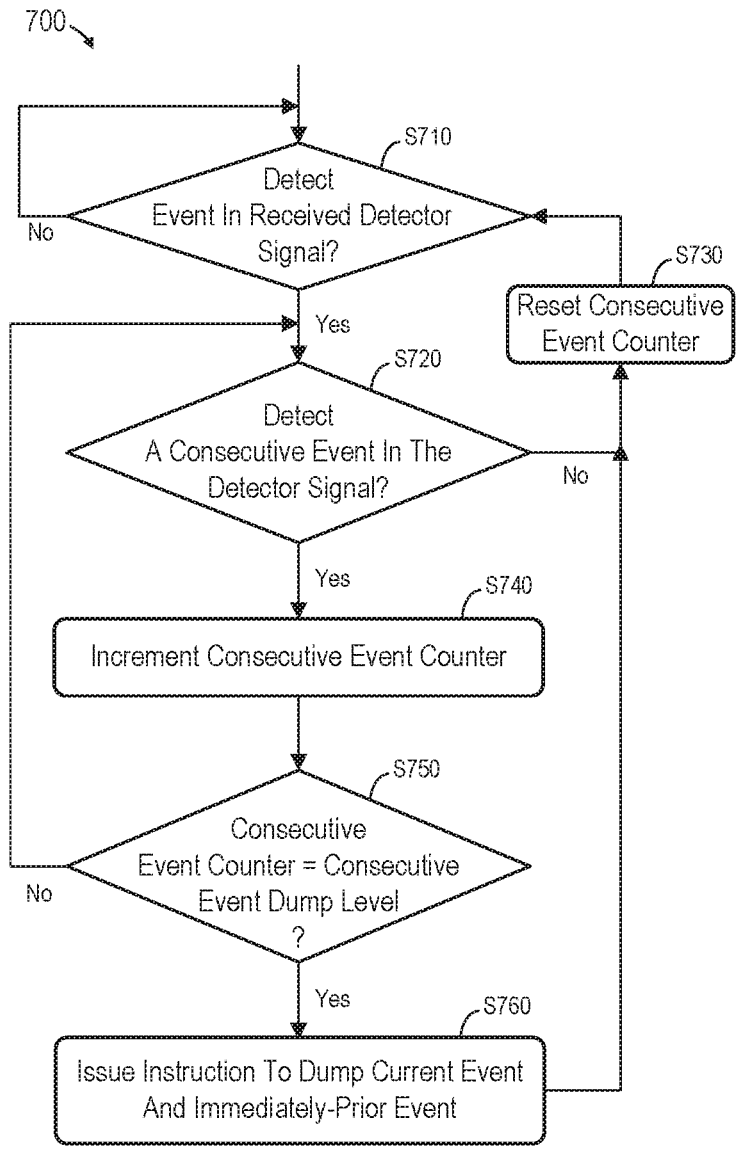
FIG. 7 is a flow diagram of a process to control event dumping according to some embodiments.

FIG. 7 illustrates process 700 to control the dumping of consecutive events according to some embodiments. Process 700 may be performed by event discriminator 440 or by event management control 645 of event discriminator 640, based on a stored consecutive event dump level. As shown, event management control 645 includes a dump control module to execute process 700 in conjunction with event discriminator 640 according to some embodiments.

Initially, at S710, it is determined whether a received detector signal indicates the occurrence of an event. An event may be indicated by a pulse emitted by a light sensor and formed from electrons resulting from an interaction between a gamma photon and a scintillator as described above. Detection of a pulse of a detector signal may comprise monitoring a signal from a light sensor of a detector (e.g., from a PMT of array 14) and determining that the amplitude of the signal has increased from some baseline value to a triggering threshold. With respect to FIG. 2, detection of the first pulse may comprise detection of the first "hump" of signal 200.

Next, at S720, it is determined whether the detector signal indicates an event that is consecutive to the prior detected event. A "consecutive" event is described herein as an event which overlaps the prior event. S720 may therefore comprise a determination of whether the detector signal rises after the hump of the prior pulse but before the prior pulse has been fully integrated or the signal has decreased back to a baseline level. If no such overlapping (i.e., piled-up) pulse is detected, the first pulse can be considered a full, non-overlapped pulse and flow proceeds to S730 to reset a consecutive event counter as shown in event management control 640.

The consecutive event counter is incremented at S740 if a consecutive event is detected at S720. Next, it is determined at S750 whether the value of the consecutive event counter is equal to the consecutive event dump level stored in the consecutive event dump register. In this regard, the consecutive event dump level may be initialized to a default value. However, based on signals received from backend FPGA 650 as described above with respect to process 500, the event dump register control of event management control 645 may increment or decrement the consecutive event dump level stored in the consecutive event dump register, thereby dynamically throttling the dump level based on the current event count rate.

Flow returns to S720 from S750 if the value of the consecutive event counter is not equal to (i.e., less than) the consecutive event dump level. Either another consecutive event is not detected, in which the consecutive event counter is reset at S730 and flow returns to S710, or another consecutive event is received and the consecutive event counter is incremented at S740.

At some point, flow may cycle between S720, S740 and S750 over a sufficient number of iterations such that the determination at S750 becomes positive. That is, the consecutive event counter becomes equal to the consecutive event dump level. Consequently, at S760, an instruction is issued to dump the current event and the immediately prior detected event. The instruction is issued to the integration and un-piling FPGA (e.g., FPGA 420). Such dumping causes the integrated values of these events to be ignored and therefore these events will not be un-piled, resulting in a decreased number of events being passed to the backend FPGA. Flow then returns to S730 to reset the event counter and continue as described above.

It should be noted that the consecutive event dump level may dynamically change based on the event count rate, thereby reducing or increasing the count rate as appropriate.

An event discriminator according to some embodiments may conduct other processing in performing event validation and discrimination as is known. Such further processing may include evaluation of event time (noise pulses may be shorter than event pulses), event peak width (several small events occurring close together will appear as a single event with a slow rise), event spacing (events occurring too close together may be difficult to un-pile accurately), and energy validation (to determine whether the pulse includes useful imaging information). Such processing may also result in instructing the integration and un-piling FPGA to dump certain events.

Figure 8:
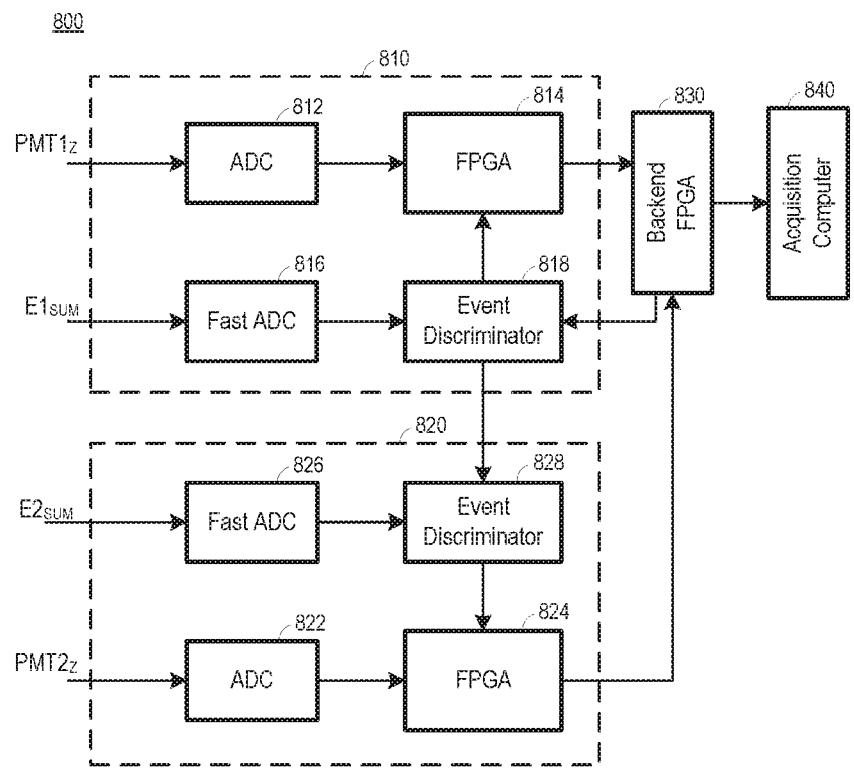
FIG. 8 is a functional block diagram of a system to implement a process according to some embodiments.

FIG. 8 is a block diagram of system 800 according to some embodiments. System 800 includes master detector 810 and slave detector 820. Master detector 810 and slave detector 820 receive signals from different PMTs and provide their integrated events to a single backend FPGA 830. FPGA 830 interleaves the events received from each detector 810, 820 and provides the event stream to acquisition computer 840 as described above.

Backend FPGA 830 may operate as described above with respect to process 500. Specifically, backend FPGA 830 may count total events received from FPGA 814 and FPGA 824 over a specified integration time, and instruct an event management control of event discriminator 818 to increment or decrement a consecutive event dump level based thereon. As shown, event discriminator 818 is linked to event discriminator 828 of slave detector 820. According to some embodiments, event discriminator 818 passes the instruction to event discriminator 828, which increments or decrements the consecutive event dump register of its event management control based thereon. Event discriminator 818 and 828 then function independently as described with respect to process 700 and based on their respective dynamically-modified consecutive event dump levels.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A system comprising:
   a signal processing system to receive a digital signal associated with first scintillation events and to determine a value associated with each of one or more of the first scintillation events;
   a backend processing system to:
     receive the values from the signal processing system;
     determine an event rate based on the received values from the signal processing system;
     determine whether the event rate is greater than a first threshold; and
     if it is determined that the event rate is greater than the first threshold, transmit a first instruction to increase a consecutive event dump level; and
   an event management control to:
     receive the first instruction to increase the consecutive event dump level;
     increase the consecutive event dump level in response to the received instruction;
     determine a number of consecutive scintillation events of one or more detected second scintillation events;
     determine to dump one or more of the consecutive scintillation events based on a comparison between the number of consecutive scintillation events and the consecutive event dump level; and
     transmit a second instruction to the signal processing system to dump the one or more of the consecutive scintillation events.

2. A system according to claim 1, the backend processing system further to:
   determine whether the event rate is less than a second threshold; and
   if it is determined that the event rate is less than the second threshold, transmit a third instruction to the event management control to decrease the consecutive event dump level,
   wherein the second threshold is less than the first threshold.

3. A system according to claim 1, further comprising:
   a second system comprising:
     a second signal processing system to receive a second digital signal associated with third scintillation events and to determine a value associated with each of one or more of the third scintillation events; and
     a second event discriminator system to:
       receive a third instruction from the event discriminator system to increase a consecutive event dump level of the second system;
       determine a second number of consecutive scintillation events of a detected one or more fourth scintillation events;
       determine to dump one or more of the second number of consecutive scintillation events based on a comparison between the second number of consecutive scintillation events and the increased consecutive event dump level of the second system; and
       transmit a fourth instruction to the second signal processing system to dump the one or more of the second number of consecutive scintillation events, wherein the backend processing system is further to:
     receive the values from the second signal processing system; and
     determine the event rate based on the received values from the second signal processing system and the received values from the signal processing system.

4. A system according to claim 3,
   the event management control comprising a consecutive event dump register storing the consecutive event dump level, and
   the backend processing system comprising a first threshold register storing the first threshold, an event count register storing number of events associated with the received values from the second signal processing system and the received values from the signal processing system, and an integration time register storing an integration time,
   wherein determination of the event rate is based on the stored number of events and the integration time.

5. A system according to claim 3, the backend processing system further to:
   determine whether the event rate is less than a second threshold; and
   if it is determined that the event rate is less than the second threshold, transmit a fourth instruction to the event management control to decrease the consecutive event dump level,
   wherein the second threshold is less than the first threshold.

6. A system according to claim 5,
   the event management control comprising a consecutive event dump register storing the consecutive event dump level, and
   the backend processing system comprising a first threshold register storing the first threshold, a second threshold register storing the second threshold, an event count register storing number of events associated with the received values from the second signal processing system and the received values from the signal processing system, and an integration time register storing an integration time,
   wherein determination of the event rate is based on the stored number of events and the integration time.

7. A system according to claim 1,
   the event management control comprising a consecutive event dump register storing the consecutive event dump level, and
   the backend processing system comprising a first threshold register storing the first threshold, an event count register storing number of events associated with the received values, and an integration time register storing an integration time,
   wherein determination of the event rate is based on the stored number of events and the integration time.

8. A method comprising:
   receiving a plurality of values from a first signal processing system, each of the plurality of values associated with detection of a gamma photon;
   determining an event rate based on the received plurality of integrated values;
   determining whether the event rate is greater than a first threshold;
   if it is determined that the event rate is greater than the first threshold, transmitting a first instruction to increase a consecutive event dump level;
   increasing the consecutive event dump level in response to the received instruction;

receiving a signal associated with one or more gamma photon detection events;

determining a number of consecutive detection events of the one or more gamma photon detection events;

determining to dump one or more of the consecutive gamma photon detection events based on a comparison between the number of consecutive gamma photon detection events and the consecutive event dump level; and transmitting a second instruction to dump the one or more of the consecutive gamma photon detection events.

9. A method according to claim 8, further comprising:

determining whether the event rate is less than a second threshold; and if it is determined that the event rate is less than the second threshold, transmitting a third instruction to decrease the consecutive event dump level, wherein the second threshold is less than the first threshold.

10. A method according to claim 8, further comprising:

receiving a second plurality of values from a second signal processing system, each of the second plurality of values associated with detection of a gamma photon; and determining the event rate based on the received second plurality of values from the second signal processing system and the received plurality of values from the first signal processing system;

receiving a third instruction to increase a second consecutive event dump level;

receiving a signal associated with one or more fourth gamma photon detection events;

determining a second number of consecutive gamma photon detection events of the one or more fourth gamma photon detection events;

determining to dump one or more of the second number of consecutive gamma photon detection events based on a comparison between the second number of gamma photon detection events and the increased second consecutive event dump level; and transmitting a fourth instruction to the second signal processing system to dump the one or more of the second number of consecutive gamma photon detection events.

11. A method according to claim 10, further comprising:

storing the consecutive event dump level in a consecutive event dump register;

storing the first threshold in a first threshold register;

storing a number of events associated with the received values from the second signal processing system and the received values from the first signal processing system in an event count register; and storing an integration time in an integration time register, wherein the event rate is determined based on the stored number of events and the integration time.

12. A method according to claim 10, further comprising:

determining whether the event rate is less than a second threshold; and if it is determined that the event rate is less than the second threshold, transmitting a fourth instruction to decrease the consecutive event dump level, wherein the second threshold is less than the first threshold.

13. A method according to claim 12, further comprising:

storing the consecutive event dump level in a consecutive event dump register;

storing the first threshold in a first threshold register;

storing the second threshold in a second threshold register;

storing a number of events associated with the received values from the second signal processing system and the received values from the first signal processing system in an event count register; and storing an integration time in an integration time register, wherein the event rate is determined based on the stored number of events and the integration time.

14. A method according to claim 8, further comprising:

storing the consecutive event dump level in a consecutive event dump register;

storing the first threshold in a first threshold register;

storing a number of events associated with the received values from the first signal processing system in an event count register; and storing an integration time in an integration time register, wherein the event rate is determined based on the stored number of events and the integration time.

15. A non-transitory medium storing processor-executable process steps, the process steps executable by a computing system to:

receive a plurality of values from a first signal processing system, each of the plurality of values associated with detection of a gamma photon;

determine an event rate based on the received plurality of values;

determine whether the event rate is greater than a first threshold;

if it is determined that the event rate is greater than the first threshold, transmit a first instruction to increase a consecutive event dump level;

increase the consecutive event dump level in response to the received instruction;

receive a signal associated with one or more gamma photon detection events;

determine a number of consecutive detection events of the one or more gamma photon detection events;

determine to dump one or more of the consecutive gamma photon detection events based on a comparison between the number of consecutive gamma photon detection events and the consecutive event dump level; and transmit a second instruction to dump the one or more of the consecutive gamma photon detection events.

16. A medium according to claim 15, the process steps executable by a computing system to:

determine whether the event rate is less than a second threshold; and if it is determined that the event rate is less than the second threshold, transmit a third instruction to decrease the consecutive event dump level, wherein the second threshold is less than the first threshold.

17. A medium according to claim 15, the process steps executable by a computing system to:

receive a second plurality of values from a second signal processing system, each of the second plurality of values associated with detection of a gamma photon; and determine the event rate based on the received second plurality of values from the second signal processing system and the received plurality of values from the first signal integration system;

receive a third instruction to increase a second consecutive event dump level;

receive a signal associated with one or more fourth gamma photon detection events;

determine a second number of consecutive gamma photon detection events of the one or more fourth gamma photon detection events;

determine to dump one or more of the second number of consecutive gamma photon detection events based on a comparison between the second number of gamma photon detection events and the increased second consecutive event dump level; and transmit a fourth instruction to the second signal processing system to dump the one or more of the second number of consecutive gamma photon detection events.

18. A medium according to claim 17, the process steps executable by a computing system to:

store the consecutive event dump level in a consecutive event dump register;

store the first threshold in a first threshold register;

store a number of events associated with the received values from the second signal processing system and the received values from the first signal processing system in an event count register; and store an integration time in an integration time register, wherein the event rate is determined based on the stored number of events and the integration time.

19. A medium according to claim 17, the process steps executable by a computing system to:

determine whether the event rate is less than a second threshold; and if it is determined that the event rate is less than the second threshold, transmit a fourth instruction to decrease the consecutive event dump level, wherein the second threshold is less than the first threshold.

20. A medium according to claim 19, the process steps executable by a computing system to:

store the consecutive event dump level in a consecutive event dump register;

store the first threshold in a first threshold register;

store the second threshold in a second threshold register;

store a number of events associated with the received values from the second signal processing system and the received values from the first signal processing system in an event count register; and store an integration time in an integration time register, wherein the event rate is determined based on the stored number of events and the integration time.

* * * * *